2,795,480

RECOVERY OF URANIUM FROM AQUEOUS PHOSPHATE CONTAINING SOLUTIONS

Elmer F. Stephan and Garson A. Lutz, Columbus, Ohio, assignors to the United States of America as represented by the United States Atomic Energy Commission No Drawing. Application August 3, 1951,
Serial No. 240,266

3 Claims. (Cl. 23—14.5)

The process of the present invention is concerned with the recovery of uranium from aqueous phosphate solutions.

It has been found that nearly all varieties of phosphate rock contain minute concentrations of uranium. The uranium concentration of the uranium-bearing phosphate rock found in the United States is in general in the neighborhood of 0.01%. Although this concentration is very small, there are very large reserves of this uranium-containing rock in the United States. Furthermore, relatively large tonnages of phosphate rock are mined each year in the United States and are processed by the phosphate industry for the production of phosphate fertilizer, phosphoric acids and other like products.

In the past no attempt has been made to recover the uranium as a by-product of the phosphate industry. There were several factors which contributed to this lack of interest in the recovery of uranium. One of these, of course, was the general lack of interest in the element itself. Another factor, however, was the lack of any suitable process for the recovery of the uranium. The very small concentration of uranium in phosphate rock and the large number and relatively high concentrations of other contaminating elements in phosphate rock made it necessary that a recovery process be very sensitive and highly selective for uranium in order to be suitable. Furthermore, since there are several different methods for processing phosphate rock, the by-product recovery method should also be universally applicable to the various commercial phosphate processes, and should be sufficiently adaptable that it could be utilized with the minimum amount of dislocation of the primary processes.

Fortunately, most methods of processing phosphate rock are directed to the conversion of the insoluble phosphate component of the rock into a water-soluble form. In some cases, the phosphate is converted into commercial 30–35% phosphoric acid, while in other cases it is converted to the water-soluble monocalcium phosphate [Ca(H$_2$PO$_4$)$_2$], which is the main constituent of many phosphate fertilizers. For example, a mixture of monocalcium phosphate and gypsum is sold under the trade name "Superphosphate of Lime." The monocalcium phosphate compositions may be leached with water to prepare an aqueous phosphate solution having a pH of about 1–2. Both commercial phosphoric acid solutions and these aqueous leach solutions carry the uranium component of phosphate rock into solution so that they probably present the most suitable starting materials for uranium by-product recovery.

It is an object of the present invention to provide a method of recovering uranium from aqueous phosphate-containing solutions.

An additional object of the present invention is to provide a method of recovering uranium values contained in aqueous acidic leach solutions of phosphate materials.

A still further object of the present invention is to provide a method of recovering uranium values from commercial phosphoric acid solutions.

Other objects of the present invention will be apparent from the description which follows.

We have discovered that uranium values may be recovered in good yield from aqueous acidic phosphate solutions even when the uranium values are present in a concentration of as little as 10 mg. of uranium per liter and the phosphate solution also contains large concentrations of contaminating ions, such as calcium, sulfate, fluoride, chloride, Si—, iron and aluminum, by contacting such a solution with an anion exchange resin. Broadly, the process of the present invention comprises the treatment of an aqueous acidic uranium-containing phosphate solution with an anion exchange resin whereby the uranium values are adsorbed thereon. Uranium values can then be recovered from the resin by elution with a suitable eluting agent. The acidity of the solution from which the uranium is to be recovered is not critical and the hydrogen ion concentration can range from that at which precipitation commences, i. e., about $10^{-3}$ (pH of 3) to considerably greater than 1 (pH of 0). One embodiment of the present invention comprises the treatment of an aqueous acidic uranium-containing phosphate solution having a pH of between about 0.00 and 2.00 and a uranium content of between about 50–150 mg. of uranium per liter, such as an aqueous leach solution of superphosphate or a commercial phosphoric acid solution, with an anion exchange resin.

The process of the present invention may be applied directly to the recovery of uranium from commercial phosphoric acid without interfering with the marketability of the acid. It may furthermore be applied to the recovery of uranium as a by-product of commercial production of a water-soluble phosphate salt fetilizer by a slight modification of the usual practice. This modification comprises the preparation of an aqueous leach solution of the phosphate salt. The uranium is then separated from this leach solution by the process of this invention, and the leach solution containing unadsorbed phosphate values returned to the primary process, either in the aqueous medium, or in a dry form after conventional evaporation methods are applied to the uranium depleted leach solution. Any phosphate values, which are adsorbed on the resin, may be readily recovered therefrom by elution with sulfuric acid and returned to the primary phosphate production process. By similar slight modifications, the process of the present invention may be applied to the recovery of uranium as a by-product of most commercial processes for the production of phosphate products. Commercial phosphoric acid is usually a 30–50% aqueous phosphoric acid solution and ordinarily contains numerous contaminants. A typical sample of phosphoric acid was analyzed and was found to contain the following constituents:

|   | g./liter |
|---|---|
| U | 0.117 |
| Al$^{+3}$ | 0.35 |
| Ca$^{+2}$ | 1.43 |
| Fe$^{+2}$ and Fe$^{+3}$ | 7.14 |
| Cl$^{-1}$ | 0.0105 |
| F$^{-1}$ | 24.0 |
| Si | 1.03 |
| SO$_4^{-2}$ | 16.5 |
| V | 0.101 |

Depending upon the source of the acid, the uranium content may vary between about 50 and 120 mg. of uranium per liter. The ratio of uranium to other contaminants shown by the above table is not limited to phosphoric acid, but is common to the average solution prepared from phosphate rock.

Although uranium in a reduced valence state may be recovered by the process of this invention it has been found advisable for optimum uranium recovery to convert all uranium values present in the uranium-containing solution to the uranyl form before contacting the phosphate solution with the anion exchange resin. This may be accomplished by contacting the solution with any of the usual oxidizing agents. One conventional method by which this may be accomplished is to contact the solution with one gram of potassium permanganate per liter of solution.

Any convenient method of contacting the uranium-containing solution with the anion exchange resin may be employed. The two methods which are conventional are the batch method and the column method. In the first method, the solution is mixed with a suitable quantity of resin and the two stirred or shaken together until equilibration is complete. The solution is then separated from the resin by filtration, decantation or centrifugation and the uranium values recovered from the resin. The column method which is usually more convenient for commercial applications depends upon the use of an elongated column containing the resin. The phosphoric acid solution containing uranium is passed through the column and the uranium thus adsorbed on the resin. Following this adsorption cycle, a second solution which will elute the uranium values from the resin is passed through the column. This is usually referred to as the elution cycle. The methods of carrying out the adsorption of the uranium on the resin and the desorption therefrom are not critical and conventional methods of ion exchange adsorption and desorption may be employed.

Numerous types of anion exchange resin have been used in the recovery of uranium from dilute solutions thereof. In general, it was found that the intermediate base type resins, such as the secondary amine resins, had the highest capacity, with weak base resins having a good capacity and the strongly basic quaternary amine type resins having somewhat lower capacity but excellent stability. The recovery of uranium by the process of the present invention employing numerous examples of commercially available anion exchange resins is demonstrated by the method described in the following example.

EXAMPLE I

Five-gram samples of air-dried resin were conditioned with 150 ml. of 35% chemically pure phosphoric acid. Each sample of the conditioned resin was then placed in a glass-stoppered flask with 200 ml. of 35% chemically pure phosphoric acid containing 20 mg. of uranium and the mixture shaken for twenty-four hours at 25° C. The resin was then separated from the solution and analyzed to determine the amount of uranium adsorbed thereon. In the following table, the results of these experiments are disclosed. The trademark of the resin is given together with a general description of the resin. Dowex 50 is further identified as to composition and manner of preparation in "Industrial and Engineering Chemistry," vol. 40, pages 1350–5 (1948) and U. S. Patent 2,366,007 referred to therein. The composition and manner of preparation of Ionac A–300 is described in U. S. Patents 2,469,683 and 2,515,142.

Table I

| Trademark of Resin | Type of Resin | Description of Resin | Uranium Adsorbed mg. of uranium per g. of resin |
|---|---|---|---|
| Amberlite IRA–400 | Strong | Quaternary amine-type, monofunctional in nature. | 0.47 |
| Dowex 1 | do | Quaternary amine-type | 0.63 |
| Dowex 2 | do | do | 0.74 |
| Amberlite IR–4B | Weak | Modified phenol formaldehyde polyamine condensate. | 1.87 |
| De-Acidite | do | Aliphatic amine-type | 2.32 |
| Duolite A–2 | do | | 1.32 |
| Duolite A–4 | do | | 1.41 |
| Duolite A–5 | do | | 1.07 |
| Ionac A–300 | Intermediate | Epichlorohydrin polamine-type | 2.68 |
| Permutit S | do | Strongly basic amine-type resin | 2.68 |
| Duolite A–6 | | Quaternary amine-type | 0.75 |
| Ionac A–301 | | Quaternized Ionac A–300 | 1.86 |
| Ionac A–293M | | Melamine-guanidine-formaldehyde resin. | 1.73 |

Several examples of the recovery of uranium from commercial phosphoric acid by the process of this invention follow.

EXAMPLE II

Ninety grams of "Amberlite IRA–400" anion exchange resin (a quaternary amine-type strong base anion exchange resin) was conditioned with a 10% aqueous sodium hydroxide solution by soaking the resin in the solution for twelve hours. The resin was then removed from the sodium hydroxide solution and washed with 500 ml. of distilled water. The resin was then placed in a tube having an inside diameter of 0.75 inch to form a resin exchange column 19 inches in length. Four hundred cc. of commercial 36% phosphoric acid having a pH of 0.6 and containing 20 mg. of uranium was then passed through the resin column over a period of two hours. The commercial acid contained the usual quantities of contaminants such as calcium, fluoride, sulfate, iron and aluminum. The effluent from the adsorption cycle was analyzed and it was found that 18 mg. of the uranium had been adsorbed upon the resin.

EXAMPLE III

Thirty-eight grams of "Amberlite IRA–400" anion exchange resin was conditioned with a 10% sodium hydroxide solution as described in Example II. The resin was then washed with 500 ml. of distilled water and then added to a flask containing 400 ml. of the phosphate solution of Example II, said phosphate solution containing 20 mg. of uranium. The mixture was stirred for fifteen minutes and then filtered to remove the resin. Upon analysis, it was found that 11 mg. of uranium had been adsorbed upon the resin.

Substantially similar methods are employed for the recovery of uranium values from aqueous leach solutions of soluble phosphatic materials. The phosphatic materials which will probably be most often used for leaching are phosphate fertilizers wherein the phosphate values of the phosphate rock have been converted to the monocalcium phosphate either as an end-product of the primary phosphate process or as an intermediate product. Any product containing soluble phosphate may be subjected to an aqueous leach and the uranium recovered therefrom by the process of this invention. Ammonium phosphate fertilizer is one example of such products. The usual phosphate leach solution will have a pH of approximately 1–2 and contain between about 50 and 100 mg. uranium per liter as well as 3–4% of calcium oxide, 15–20% of P₂O₅ and small concentrations of aluminum, iron, fluoride, silicate, and sulfate ions. These leach solutions may be contacted with anion exchange resins in the same way as has been previously described for contacting the phosphoric acid solutions with anion exchange resins. The process of this invention as applied to phosphate aqueous leach solutions of monocalcium phosphate materials is illustrated by the examples which follow.

EXAMPLE IV

Five grams of an anion exchange resin was washed with 150 ml. of 4% sodium hydroxide and then converted to the phosphate cycle by treatment of the resin with 150 ml. of C. P. (chemically pure) 35% phosphoric acid. The conditioned resin was mixed was 200 ml. of monocalcium phosphate solution containing 3.4% of calcium oxide, 16.5% P₂O₅ and 25 mg. of uranium. The solution had a measured pH of 1.5. This mixture was then shaken for twenty-four hours at 25° C. Following this equilibration period, the resin was separated from the supernatant and the amount of uranium adsorbed on the resin determined by the difference in uranium content of the solution before equilibration and after equilibration. This method was carried out with four types of resin and it was found that the milligrams of uranium adsorbed per gram of resin ranged from 1.12 for an epichlorohydrin polyamine-type resin to 0.63 for a quaternary amine-type resin. The two other resins which gave intermediate results were a monofunctional quarternary amine-type resin and a secondary amine-type resin.

EXAMPLE V

A column containing 75 g. of the anion exchange resin, "Ionac A-300," was prepared. The resin was washed with 4% sodium hydroxide and then with C. P. 35% phosphoric acid to convert it to the phosphate cycle. Eighteen liters of monocalcium phosphate solution containing 1224 mg. of uranium was then passed through the column. Seven hundred mg. of the uranium was adsorbed by the resin in this adsorption cycle. Although this represents an over-all removal efficiency of 57.1%, it was found that 94.8% of the uranium was removed from the first four liters of solution to pass through the resin column and the removal rate decreased to 31% for the last six liters of effluent from the column.

Several modifications of the present basic invention which give increased uranium recovery from phosphate-containing solutions have been discovered. The first of these modifications is concerned with the pretreatment of the phosphate-containing solution with a strong base-type anion resin before its final treatment with an intermediate base-type anion resin. This modification depends upon the discovery that a considerable amount of the adsorptive capacity of the intermediate base-type resin was taken up by the adsorption of such contaminating anions as phosphate, silicate, sulfate and fluoride ions during the uranium adsorption cycle by the secondary amine intermediate base-type resin. It was noted that these contaminating ions were more strongly adsorbed upon the quaternary amine strong base-type resins than upon the intermediate base-type resin but that these quaternary amine strong base-type resins had a lesser affinity for uranium values than did the secondary amine intermediate base-type resins. It was found that the commercial phosphoric acid solution could be passed through a bed of the quaternary amine-type resin and the effluent from this cycle then passed through a bed of the intermediate base resin such as "Ionac A-300" with a minimum adsorption of the uranium on the strong base-type resin and an increased adsorption by the intermediate base resin of uranium over that which was obtained from commercial phosphoric acid solutions which had not been pretreated with the strong base-type resins. This modification of the present invention is illustrated by the following examples in which a commercial phosphoric acid solution containing uranium is pretreated with a quaternary amine strongly basic anion exchange resin before the solution is contacted with an intermediate base-type resin.

EXAMPLE VI

One hundred grams of "Amberlite IRA-400" was conditioned with one liter of a 4% sodium hydroxide solution and the resin was then converted to the phosphate cycle by treatment with one liter of C. P. 35% phosphoric acid. The conditioned resin was transferred to a column having 2.5-cm. inside diameter. Fifty g. of "Ionac A-300," a secondary amine intermediate-type anion exchange resin, was also conditioned with 4% sodium hydroxide and then converted to the phosphate cycle with C. P. 35% phosphoric acid. This resin was then transferred to a second column. Two liters of commercial phosphoric acid containing a total of 192 mg. of uranium was passed through the strong base anion exchange resin column at a flow rate of 1300 ml./hr. The effluent from this column was then passed through the intermediate base resin anion exchange column at a flow rate of 400 ml./hr. It was found that 14 mg. of the uranium was adsorbed upon the strong base resin and 55 mg. of uranium was adsorbed upon the intermediate base resin. This represented a recovery of 13.5% of the original uranium upon the strong base resin and 27% of the original uranium content of the solution upon the intermediate base resin.

In a slightly different modification, the uranium-containing solution is pretreated with a nuclear sulfonic type cation exchange resin before the main adsorption cycle which is carried out with an intermediate base anion exchange resin. This modification is illustrated by the example which follows.

EXAMPLE VII

In this example, three separate tests were run to compare the recovery of uranium by an intermediate base anion exchange resin column without pretreatment with the recovery of uranium by an intermediate base anion exchange resin following a pretreatment with a nuclear sulfonic acid aromatic type cation exchange resin, "Amberlite IR-120"; and in the third test, the recovery of uranium on an intermediate base anion exchange type resin following pretreatment with a sulfonated aromatic hydrocarbon polymer-type cation exchange resin, "Dowex 50." The cation exchange resins were prepared by first conditioning 100 g. of the cation exchange resin with one liter of C. P. 35% phosphoric acid. Each of the conditioned resins was then transferred to a column having an inside diameter of 2.5 cm. Two-liter samples of commercial phosphoric acid containing 192 mg. of uranium values were then passed through each of the cation exchange resin columns at a flow rate of 400 ml./hr. The effluent acid samples from each column were then flowed through an anion exchange resin column containing 50 g. of the secondary amine intermediate base-type anion exchange resin, "Ionac A-300," at a flow rate of 400 ml./hr. A third 2-liter sample of commercial phosphoric acid was passed through an intermediate base-type anion exchange resin column without pretreatment. The amount of uranium recovered upon each resin column is shown in the following table.

*Table II*

| Resin Type | | Percent U Removed from 2 liters of Soln. by Resin | Mg. of U Adsorbed per g. of Resin |
|---|---|---|---|
| Anion Exchanger | Cation Exchanger | | |
| Ionac A-300 | | 25.0 | 0.96 |
| Do | | 0.0 | 0.00 |
| Do | Amberlite IR-120 | 36.4 | 1.40 |
| Do | Dowex 50 | 4.3 | 0.04 |
| | | 36.8 | 1.40 |

It will be seen from this table that an approximately 50% higher recovery upon the anion exchange resin was achieved by pretreatment of the commercial phosphoric acid with the cation exchange resin. It will further be noted that substantially no uranium was adsorbed on the cation exchange resin during the pretreatment. While this modification of the present invention has been illustrated by the example showing recovery of uranium from commercial phosphoric acid, this modification is equally applicable to the recovery of uranium from any solution containing similar contaminants, for example an aqueous leach solution of superphosphate.

Another modification of the present invention which gave an improved recovery of uranium from phosphate-containing solutions is concerned with the reactivation of the anion exchange resin by treating the resin with a sulfuric acid solution prior to the elution of the uranium values. In this modification, the uranium-containing phosphoric acid solution is contacted with an anion exchange resin in substantially the same way as previously described. Following this adsorption cycle, however, the resin is contacted with a limited amount of a 10–20% sulfuric acid solution. It has been found that the limited amount of sulfuric acid solution will remove much of the adsorbed phosphate values from the resin without removing substantially any of the uranium adsorbed thereon. One or more additional uranium adsorption-reactivation cycles may then be carried out before the uranium elution cycle is carried out. It has been found that as many as five adsorption-reactivation cycles may be carried out without reducing the adsorption efficiency for uranium of an intermediate base resin below 75%. In this manner the concentration of the uranium on the resin may be built up from ~0.035% uranium adsorbed on the resin in one cycle to ~1.34% total uranium adsorbed on the resin in five cycles. An example illustrating this modification as applied to commercial phosphoric acid and four types of anion exchange resin follows.

EXAMPLE VIII

Four anion exchange columns were prepared. The first column contained "Ionac A–300," a secondary amine, intermediate base type resin. The second column contained "Amberlite IR–4B" anion exchange resin, a modified phenol formaldehyde polymer condensate weak base resin. The third column contained "Amberlite IRA–400" resin, a quaternary amine strong base type anion exchange resin. The fourth column contained "Dowex–1," also a quaternary amine strong base type resin. The resins in each case had been prepared by equilibration with sodium hydroxide followed by treatment with C. P. 35% phosphoric acid. Each column contained 500 g. of the treated resin. During the adsorption cycle, two liters of commercial 35% phosphoric acid containing 128 mg. of uranium per liter was passed through each column. An activation cycle was then carried out by passing 300 ml. of 17.5% sulfuric acid through each column. Following the activation of the column, a second 2-liter sample of commercial 35% phosphoric acid containing 128 mg. of uranium was passed through each column and each column then activated. Five such adsorption-activation cycles were carried out on each column and the results are shown in the accompanying table.

*Table III*

[Percent of U adsorbed from a 2-liter commercial phosphoric acid solution adsorption cycle influent on each cycle.]

| Resin | Cycles | | | | |
|---|---|---|---|---|---|
| | I | II | III | IV | V |
| Ionac A–300 | 98 | 97 | 95 | 90 | 75 |
| Amberlite IR–4B | 95 | 82 | 70 | 57 | |
| Amberlite IRA–400 | 79 | 63 | 52 | 39 | |
| Dowex–1 | 78 | 50 | 42 | 28 | |

While the foregoing modification has been illustrated with an example showing the recovery of uranium from commercial phosphoric acid, the method disclosed is equally applicable to the recovery of uranium from other phosphate solutions containing uranium in dilute concentrations.

Uranium adsorbed on anion exchange resins may be readily removed by elution with dilute nitric acid or hydrochloric acid, dilute alkalis, or dilute solutions of inorganic salts. The eluant may contain a small percentage of a complexing agent such as 0.5–2% $H_2O_2$. Preferable eluants have been found to be 1 N hydrochloric acid, 1 N nitric acid and 1 N sodium hydroxide containing 1% hydrogen peroxide. The normalities of the eluting solutions are not critical and good elution may be obtained from approximately 0.5–3 N solutions. An increase in the concentration of the eluting agents above 3 N, however, tends to decrease the effectiveness thereof. For example, the elution efficiency of 5 N hydrochloric acid is approximately one-half the efficiency of 1 N hydrochloric acid. Other concentrated elution agents have similar decreases in effectiveness over more dilute solutions of the same agent. An example showing the relative amount of uranium eluted from a typical anion exchange resin by various eluting agents follows.

EXAMPLE IX

Ten grams of an epichlorohydrin polyamine-type resin was conditioned to the phosphate cycle as previously described and was then placed in a column having an inside diameter of 1 cm. and a length of 45 cm. A one-liter solution of 35% phosphoric acid containing 100 mg. of uranium was then passed through the column. The uranium was then recovered from this and similarly prepared columns by passing five separate portions of the various elution solutions shown in Table IV through the column. In the case of the evaluation of the 1 N elution solutions, five 50-ml. portions were used whereas in the evaluation of the 5 N elution solutions five 25-ml. portions of the 5 N elution solution were used. The results obtained with various elution agents in both 1 N and 5 N concentrations are shown in Table IV.

It will be apparent to those skilled in the art that the basic method and modifications thereof set forth above for the separation of uranium from phosphate solutions containing dilute uranium concentrations provide a simple and practical procedure for the procurement of a high degree of recovery from the phosphate solutions and mixtures which are normally encountered in commercial practice. While this invention has been illustrated by restricted applications thereof, it is not desired to be specifically limited thereto, since it is manifest to those skilled in the art, to which the present invention is directed, that it is susceptible to numerous modifications without departing from the scope thereof. In particular, it may be pointed out that the process with slight modifications may be employed in the recovery of uranium from any phosphate solution containing uranium and is not in any way limited to the recovery of uranium as a by-product.

It will therefore be understood that this invention is not to be limited to the details given herein but that it may be modified within the scope of the appended claims.

Table IV

| Eluant | Total Uranium Adsorbed on Resin, mg. | Uranium Recovered, mg. uranium per 50-ml. portion of eluant | | | | | Total Uranium Recovered by Eluant, mg. | Uranium Recovered, Percent |
|---|---|---|---|---|---|---|---|---|
| | | portions | | | | | | |
| | | 1 | 2 | 3 | 4 | 5 | | |
| *1 N Soln.* | | | | | | | | |
| HCl | 28 | 0.05 | 0.11 | 19.95 | 3.35 | 1.00 | 24 | 86 |
| HNO$_3$ | 26 | 0.05 | 0.05 | 7.50 | 10.10 | 3.75 | 21 | 81 |
| H$_2$SO$_4$ | 18 | 0.03 | 0.03 | 0.14 | 0.24 | 0.24 | 0.6 | 3 |
| NaOH+H$_2$O$_2$* | 25 | 0.03 | 4.05 | 13.90 | 1.05 | 0.15 | 19 | 76 |
| NH$_4$+H$_2$O$_2$* | 30 | 0.48 | 4.25 | 1.40 | 0.90 | 0.60 | 8 | 27 |
| Na$_2$CO$_3$ | 29 | 0.06 | 1.10 | 1.40 | 2.30 | 2.25 | 7 | 24 |
| (NH$_4$)$_2$CO$_3$ | 27 | 0.03 | 0.34 | 4.30 | 4.15 | 3.90 | 13 | 48 |
| NaNO$_3$ | 26 | 0.05 | 0.06 | 0.16 | 0.32 | 0.18 | 0.8 | 3 |
| | | Uranium Recovered, mg. uranium per 25-ml. portion of eluant | | | | | | |
| | | portions | | | | | | |
| *5 N Soln.* | | 1 | 2 | 3 | 4 | 5 | | |
| HCl | 23 | 0.02 | 7.95 | 2.55 | 13.75 | 1.30 | 13 | 56 |
| HNO$_3$ | 28 | 0.12 | 21.15 | 8.75 | 6.45 | 2.55 | 20 | 71 |
| H$_2$OS$_4$ | 31 | 0.05 | 1.40 | 3.05 | 2.50 | 2.15 | 5 | 16 |
| NaOH+H$_2$O$_2$* | 24 | 14.85 | 14.15 | 1.00 | 0.09 | 0.09 | 15 | 63 |

*Contained 1% H$_2$O$_2$.

What is claimed is:

1. The method of recovering uranium values from a phosphate solution, which comprises passing a phosphate solution having a pH of between about 0.00 and 3.00 and a uranium concentration of between 10 and 150 mg. of uranium per liter of solution through a column containing a nuclear sulfonic type cation exchange resin and then passing the effluent from said cation exchange resin column through a column containing an intermediate base type anion exchange resin.

2. The method of recovering uranium values from a phosphate solution having a pH of between about 0.00 and 3.00, which comprises carrying out an adsorption cycle by passing said solution through a column containing an anion exchange resin, carrying out an activation cycle by passing a limited amount of a 5–50% sulfuric acid solution through said resin column whereby phosphate values adsorbed thereon are eluted but substantially no uranium values are eluted, repeating said consecutive adsorption and activation cycles until a substantial uranium concentration is built up on said resin, and then recovering said uranium values from the resin.

3. The method of recovering uranium values from a commercial 30–50% phosphoric acid solution, which comprises carrying out an adsorption cycle by passing said solution through a column containing an epichlorohydrin polyamine type anion exchange resin, carrying out an activation cycle by passing a limited amount of a 17.5% sulfuric acid solution through said column, repeating said adsorption-activation cycles until a substantial amount of uranium values have been adsorbed on said resin, and then eluting the uranium values therefrom with a 1 N sodium hydroxide solution.

References Cited in the file of this patent
FOREIGN PATENTS 946,315     France     Dec. 13, 1948

OTHER REFERENCES

Russell et al.: Journal of the American Chemical Society, vol. 65, pages 595–600 (1943).

Thompkins et al.: Journal of the American Chemical Society, vol. 69, page 2270 (1947).

Kunin et al.: Journal of the American Chemical Society, vol. 69, pages 2875–2878 (1947).

Friend: Textbook of Inorganic Chemistry, vol. 7, part 3, page 331 (1926). Published by Charles Griffin and Co., Ltd., London.

Mellor: Comprehensive Treatise on Inorganic and Theoretical Chemistry, vol. 12, pages 132–2 (1932). Pub. by Longman, Green & Co. London.

Industrial & Eng. Chem., vol. 40, pp. 1350–5 (1948).